United States Patent
Kaule et al.

(10) Patent No.: US 7,894,112 B2
(45) Date of Patent: Feb. 22, 2011

(54) SECURITY ELEMENT WITH A DIFFRACTION STRUCTURE HAVING SUBAREAS REPRESENTING RECOGNIZABLE INFORMATION

(75) Inventors: Wittich Kaule, Emmering (DE); Hajo Mueck, Dachau (DE); Siegfried Harms, Unterschleissheim (DE)

(73) Assignee: Giesecke & Devrient GmbH, Munich (DE)

( * ) Notice: Subject to any disclaimer, the term of this patent is extended or adjusted under 35 U.S.C. 154(b) by 373 days.

(21) Appl. No.: 10/565,157

(22) PCT Filed: Jul. 20, 2004

(86) PCT No.: PCT/EP2004/008111
§ 371 (c)(1),
(2), (4) Date: Jan. 19, 2006

(87) PCT Pub. No.: WO2005/009751
PCT Pub. Date: Feb. 3, 2005

(65) Prior Publication Data
US 2006/0181077 A1 Aug. 17, 2006

(30) Foreign Application Priority Data
Jul. 22, 2003 (DE) ................ 103 33 469

(51) Int. Cl.
*G03H 1/00* (2006.01)
*G03H 1/26* (2006.01)
*G02B 5/32* (2006.01)
*B42D 15/00* (2006.01)

(52) U.S. Cl. .............................. 359/2; 359/15; 359/22; 283/86
(58) Field of Classification Search ................ 359/2
See application file for complete search history.

(56) References Cited

U.S. PATENT DOCUMENTS

| 4,856,857 | A | | 8/1989 | Takeuchi et al. |
| 6,006,415 | A | * | 12/1999 | Schaefer et al. ............ 29/527.1 |
| 6,491,324 | B1 | * | 12/2002 | Schmitz et al. ............... 283/82 |
| 6,876,472 | B2 | * | 4/2005 | Menz et al. ..................... 359/2 |
| 2002/0044313 | A1 | * | 4/2002 | Menz et al. ................... 359/22 |
| 2002/0191234 | A1 | * | 12/2002 | Ishimoto et al. ............... 359/1 |
| 2004/0101676 | A1 | * | 5/2004 | Phillips et al. .............. 428/323 |

FOREIGN PATENT DOCUMENTS

| DE | 100 44 465 A1 | 3/2002 |
| EP | 0 559 069 A1 | 9/1993 |
| EP | 0 896 259 A1 | 2/1999 |
| EP | 1 197 350 A2 | 4/2002 |
| WO | WO 99/38038 A1 | 7/1999 |

* cited by examiner

*Primary Examiner*—Arnel C Lavarias
*Assistant Examiner*—Jade R Chwasz
(74) *Attorney, Agent, or Firm*—Rothwell, Figg, Ernst & Manbeck, P.C.

(57) ABSTRACT

A security element, preferably for documents of value, which at least has one area with a diffraction structure, which under specific viewing conditions reconstructs a diffractive image. This area has subareas, which do not take part in the reconstruction of the diffractive image, and which represent a recognizable information. Essential is that the information represented by the subareas is recognizable mainly only under the viewing conditions, under which the diffractive image can be perceived.

14 Claims, 11 Drawing Sheets

SECURITY ELEMENT WITH A DIFFRACTION STRUCTURE HAVING SUBAREAS REPRESENTING RECOGNIZABLE INFORMATION

CROSS-REFERENCE TO RELATED APPLICATION

This application is a National Phase of International Application Serial No. PCT/EP2004/008111, filed Jul. 20, 2004.

BACKGROUND OF THE INVENTION

1. Field of the Invention

The invention relates to a security element, preferably for documents of value, which at least has one area with a diffraction structure, which under specific viewing conditions reconstructs a diffractive image, wherein the area has subareas, which do not take part in the reconstruction of the diffractive image, and which represent a recognizable information. The invention further relates to a data carrier with such a security element, an embossing cylinder and a method for producing such a security element or document of value.

2. Description of the Background Art

Documents, in particular documents of value and identification documents, but also commercial goods and consumer durables or their packagings for the purpose of preventing forgeries and checking their authenticity often are equipped with special security features. Due to the easy availability and high quality of reproductions, which can be produced with modern color copying machines or by high-resolution scanners and color laser printers even by poorly trained staff, there is a steady demand for improving the forgery-proofness of the respective security features. For this purpose optically variable security elements proved to be good, which under different viewing directions produce different optical impressions. Such security elements, for example, have optically diffraction structures, which under different viewing angles reconstruct different images. Such effects cannot be reproduced with the usual and widespread copying techniques and printing techniques.

EP 1 197 350 A2 describes a special embodiment of such a diffractive security element for documents of value. It is a so-called two-channel hologram, which under different viewing directions reconstructs different holographic images. Each holographically reproduced image, which is visually recognizable under only one viewing direction, corresponds to one channel. To the individual channels are associated different surface areas of the hologram. The area of the hologram corresponding to a channel can be divided into a plurality of partial areas. These partial areas are formed, for example, as narrow strips. The strips belonging to different channels preferably are disposed alternatingly. Although the partial areas of a diffractive image, which belong together, are spaced apart from each other, under the specific defined viewing angle they produce a joint diffraction image. In the strip-shaped partial areas, preferably with the help of a laser, subareas are changed such that they no longer take part in the image reconstruction and represent a first or second individual information against the holographic background.

As to obtain this effect, it is necessary to very exactly incorporate the pieces of information produced with the laser into the partial areas or strips each associated with a channel. I.e., during the laser marking process at first it has to be determined to which channel the strip to be marked is associated. This is effected by checking the direction, in which incident light is diffracted and thus a holographic image is reconstructed. This check is effected, for example, by focused LEDs as light sources and optical detectors, for example a camera for determining the pertinent viewing angle. Such a method is very elaborate, in particular the efforts and the required precision will increase with the fineness of the partial areas, into which the individual partial channels are spatially divided. Hence this proceeding is hardly suitable for a rationalized large scale production method.

SUMMARY OF THE INVENTION

On the premises of this prior art the invention is based on the problem to create a security element which avoids the disadvantages of the prior art. In particular, it shall be possible to write a desired information quickly and with reasonable apparative effort into the security element.

This problem is solved by the features disclosed herein.

According to a first aspect of the invention, the subareas of the security element mentioned at the outset are integrated in the area having the diffraction structure such that the information (in the following referred to as "individual information") represented by the subareas is recognizable substantially only under the specific viewing conditions, under which also the diffractive image is recognizable. I.e., when the diffraction structure reconstructs the diffractive image stored therein under specific viewing conditions, for example under an oblique viewing angle, then the individual information also only emerges for the viewer in a recognizable fashion, when these viewing conditions, such as the oblique viewing angle mentioned by way of example, are obtained by tilting or rotating the security element. If one changes the viewing conditions, so that the diffractive image disappears, then the individual information will not be recognizable either (or only faintly).

Within the terms of the invention the concept diffraction structure means any structure diffracting light, such as a true hologram, a rainbow hologram, volume hologram, a computer-generated hologram (CGH) or a pure grating structure. The grating structures may produce any desired complex grating images, such as e.g. Kinegrams® or the like. Since in the professional world the term "hologram" has established itself instead of the general term "diffraction structure", for clarity's sake in the following at expedient places the term "hologram" is used, without this being a restriction.

Today as security elements mostly diffraction structures to be viewed in reflected light are used, in particular so-called embossed holograms. Embossed holograms are characterized in that the structure that diffracts light is realized as a three-dimensional relief structure, which is transferred onto an embossing mold. With this embossing mold usually a plastic layer is embossed, which then is provided with a reflection layer, which supports the reconstruction of the diffractive image. This reflection layer preferably is an opaque or semitransparent metal layer or a dielectric layer having a suitable refractive index.

In practice such security elements have a multilayer structure. They have at least one adhesive layer, with which they are fastened to the document of value etc., and at least one plastic foil, in which the diffraction structures are embossed, an extremely thinly formed reflection layer follows the embossed structure or three-dimensionally covers it, and a protective lacquer layer, with which the diffraction structure is protected against mechanical damage.

Alternatively, it is also conceivable, that the embossed structure is embossed in the thin metal layer which is applied onto the plastic foil or that the adhesive layer is applied onto the protective lacquer layer, as a result of which the security element is to be viewed from the "back". In both cases the viewer sees the side with the sharper relief contours, i.e. the side with the optimum holographic effect.

The relief structure representing the diffraction structure often has a symmetric profile. In special cases, however, an asymmetric profile can also be advantageous. Such relief structures are referred to as "asymmetric diffraction structures".

In the following, also for clarity's sake, the invention is illustrated with the help of such embossed holograms, which does not constitute a restriction of the invention.

Also for clarity's sake in the following it is assumed, that the diffraction structure reconstructs the diffractive image only under an oblique viewing angle, while under other viewing angles, in particular upon perpendicular viewing, it disappears. I.e., the hologram is not recognizable for the viewer upon perpendicular viewing of the security element and only clearly emerges when the security element is rotated or tilted. The terms "oblique viewing angle" and "perpendicular viewing angle" in this connection stand for specific viewing conditions, which are defined by parameters, such as direction of light incidence, light wavelength, atomic number and grating position etc., and under which the diffractive image is visible or not visible. These terms, therefore, have no restrictive effect whatsoever.

In its simplest form the security element of the abovementioned kind according to the invention has a self-contained area with a diffraction structure, in which the subareas are integrated in such a way, that the individual information represented by the subareas becomes visible mainly only under those specific viewing conditions, under which the diffractive image is also recognizable. i.e., the security element has at least one hologram, the diffraction structure of which is disposed in a continuous area, without a separation into alternatingly disposed strips being effected. Since a self-contained area with a diffraction structure is employed, an elaborate image analysis can be abandoned. Because in this case it is irrelevant, at which place exactly the subareas are produced. Therefore, the production of the subareas can be carried out continuously and with devices usable for mass production.

The subareas can be produced in different ways depending on the kind of the diffraction structure used or depending on the structure of the security element. It only has to be taken into account, that the subareas and the diffraction structure surrounding them under the viewing conditions, under which the diffraction structure does not reconstruct a diffractive image, have the same or at least very similar reflecting properties, so that the information represented by the subareas under these viewing conditions does not form a recognizable contrast to their surroundings.

In the case of an embossed hologram the effect according to the invention can be obtained, for example, by the subareas having no or a visually less recognizable diffraction structure and by the reflection layer being present both in the area of the diffraction structure and in the area of the not diffractive subareas. Since the subareas have no or a worse recognizable diffraction structure, they actually do not contribute to the reconstruction of the diffractive image and therefore due to the changed reflection conditions are recognizable under those specific viewing conditions, under which also the diffractive image is recognizable for the viewer. Under all other viewing conditions the entire area appears as an almost structureless area. The individual information represented by the subareas thus cannot be recognized by the viewer upon viewing from other than the specific viewing conditions.

The subareas which are free of any diffraction structures can be produced in any fashion. With an embossed hologram already the embossing die can be provided with the subareas that are free of any diffraction structures. Alternatively, at first the diffraction structure can be embossed in an all-over fashion into the plastic layer. The subareas are produced afterwards by destroying the diffraction structure and/or the reflection layer in certain areas, for example with the help of a laser. Normally this is effected under the action of the laser beam by partially removing the reflection layer. The individual information in this case is present in the form of breaches in the reflection layer, whereas in these areas the diffractive structures may be destroyed as well. If this is not the case, by partial absence of the reflection layer in these areas the diffractive effect is so strongly reduced, that these areas and thus the individual information under specific viewing conditions form a contrast to the holographic surroundings.

As mentioned above, the security element can be equipped also with two separate reflection layers, the one being provided in the level of the embossed structure and the other on the other side of the plastic foil. The two reflection layers are made of materials having mainly the same reflecting properties, preferably they are made of the same material. Here preferably metal layers, such as aluminum, copper or gold, are used. The subareas in this variant result from partially removing the reflection layer carrying the diffraction structure, so that with the most viewing conditions incident light is reflected mainly in the same way by both the front-side reflection layer and the back-side reflection layer. The individual information therefore is neither recognizable upon viewing in reflected light nor in transmitted light. In specific oblique viewing angles, however, as explained above, the subareas not or only very faintly contributing to the image reconstruction are contrastingly recognizable compared with their surroundings.

According to a further embodiment the subareas can also be formed by overprinting the reflection layer. The overprint can be effected, for example, according to the ink jet method. Preferably, the subareas are produced with a neutralizing printing ink, i.e., a printing ink is used, which has mainly the same or similar reflecting properties as the reflection layer. If the reflection layer is made of a metal, such as for example aluminum, for the production of the subareas preferably a metallic printing ink, such as e.g. Supersilver, will be used. In this case, too, the overprinted areas are more or less not recognizable under the most viewing conditions. In the predetermined viewing angles, however, a sharp contrast emerges, since the overprinted areas do not take part in the image reconstruction of the diffractive image.

According to a second aspect of the invention the information represented by the subareas is also visible from an angle of view differing from the predetermined viewing angles. In this case the subareas form a not diffractive contrast image, which in particular under all viewing angles of the security element is recognizable. This variant offers the advantage, that the viewer easily finds and recognizes the individual information. This information is also easier to check under the predetermined viewing angle.

In this case too the subareas can be produced in any most different fashion. As already explained above, the reflection layer may be overprinted directly, i.e. in the inner layer structure, or on the outer surface of the security element with a printing ink, in particular a metallic printing ink.

Alternatively, an embossed hologram can be used, which is applied onto a transparent carrier, wherein the subareas are present as gaps in the reflection layer. The information represented by the subareas in this case is visible in transmitted light and appears as a not diffractive contrast image. If there exists, for example, a connection in content or an identity between the reconstructed diffractive image, i.e. hologram, and the information represented by the subareas, a viewer can check the authenticity of the security element in a simple fashion by comparing the recognizable information in transmitted light and under the predetermined viewing angles.

The hologram area having the individual information according to the invention can also be embedded in a further diffractive area, this second hologram having other viewing angles. i.e., under a first complex of viewing angles only the surrounding hologram without the pieces of individual information according to the invention is recognizable, while under a second complex of viewing angles the hologram according to the invention and the individual information represented by the subareas are recognizable.

In a further advantageous embodiment of the security element the embossed plastic layer, as already explained, is provided with two separate reflection layers. Deviating from the already described embodiment (the two reflection layers to a far extent have the same reflecting properties), in an alternative embodiment the two reflection layers are made of differently-colored materials, such as for example different-colored metals or inks. The first reflection layer supporting the reconstruction of the hologram can be made of aluminum, while the opposite reflection layer for example is formed as a copper layer or gold layer. Beside the security aspects in this way additionally a visually attractive effect is obtained, because the individual information due to the two contrasting metal layers under any viewing angle stands out in color against the second metal area, and also under the predetermined viewing angle contrasts with the holographic surroundings.

The security element according to the invention of course can have a plurality of the hologram areas with respective subareas as described above. Advantageously, such hologram areas directly adjoin each other and the holograms are recognizable under different viewing angles. The viewing angles of the individual holograms can differ from each other by any angle. If the security element has only two of such hologram areas, it may be advantageous, that the viewing angles of the holograms differ from each other by angles of up to 90 degree and more.

However, there are possible embodiments, in which the viewing angles differ from each other only by small angle ranges. This is in particular the case, when a plurality of hologram areas according to the invention are put together to form a total image. For example, a circular area can be composed of circle segments, the viewing angles of which differ from each other by a small angle range. When rotating or tilting the security element the individual holograms of the circle segments become successively visible and thus also the pieces of individual information represented by the respective subareas.

This analogously applies to a circular area, which is composed of concentric circular rings, wherein each circular ring has a hologram, which is recognizable under a certain viewing angle differing from that of its adjacent circular rings. It is obvious that the individual hologram areas can also have any other geometric forms, such as rectangles, strips etc.

Up to now the invention has only been described with hologram areas, which have a self-contained geometric form. However, it is also possible to compose a hologram area of a plurality of partial areas. In the simplest case these can be individual pixel elements, preferably rectangular pixel elements, which are put together to form the hologram area according to the invention, which under predetermined viewing conditions reconstructs a diffractive image.

In a further embodiment the security element has at least two hologram areas, which under different complexes of viewing angles reconstruct a diffractive image, wherein each of the hologram areas can also consist of a plurality of partial areas. The partial areas of the different diffractive areas can be interlaced into each other, as already known from prior art, as two-channel or multi-channel holograms. The partial areas here cannot be resolved with the naked eye, but jointly contribute to the reconstruction of the respective diffractive effect. Preferably, the partial areas have a strip-shaped geometry, and the partial areas belonging to different hologram areas are disposed alternatingly. These partial areas can also be composed of individual pixel elements.

As to be able to provide such interlaced two-channel or multi-channel holograms with the pieces of individual information according to the invention without a high apparative and time effort, for example in the individual channels of the hologram areas the same individual information is incorporated in the form of the subareas according to the invention. i.e., under each of the different viewing angles of the holograms the same individual information against the respective diffractive background is recognizable.

According to a further embodiment the line width of the individual information is selected in a size at least equaling the sum of the widths of the partial areas or strips belonging to different holograms.

The individual information represented by the subareas thus is also recognizable under the respective viewing angles of the holograms, and is identical for all hologram areas (channels).

The partial areas of the individual holograms have a width of about 1 micron to about 200 micron, preferably of about 50 micron to 100 micron. The line width of the individual information depends on the number of holograms interlaced into each other. When using two holographic channels the line width thus amounts to at least 40 micron or 100 micron. In practice, however, due to the better perceptibility a line width of 500 micron or more may be expedient. The single lines of the pieces of individual information thus normally extend over many strips of one hologram channel. Although the individual information of a hologram is composed of the alternating partial areas associated with this channel, when viewing a plurality of partial areas or strips per single line the viewer does not perceive them as cut into pieces, but as homogeneous and self-contained.

In all described embodiments the pieces of individual information of the individual hologram areas each can represent only a part of one complete total information. For example, the first four numbers of a 8-digit serial number can be written in a first hologram area as subareas according to the invention and the second four numbers in a second hologram area, which differs from the first hologram area in particular in different viewing angles. Depending on the design of the subareas the total information, i.e. the complete 8-digit serial number, may be readable for example upon perpendicular viewing. When viewing the first hologram area under first respective oblique viewing angles, however, one can recognize only the first four numbers, when viewing the security element under second oblique viewing angles of the second hologram one can recognize the second four numbers. i.e. the viewer can check the correctness of the total information without any additional aids.

The written information can be any information, such as the already mentioned serial number or another identification number or any optical image, pattern, logo etc. As already explained, the viewing angles of the individual areas can be adjusted to each other such that the pieces of information of the individual areas represented by the subareas successively become recognizable by rotating and/or tilting the security element.

The security element can also have further security features, such as a diffraction structure without subareas or completely different security features, such as for example luminescent and/or magnetic and/or thermochromic security features.

The actual security element, for example, is a security thread, which at least partially is embedded in a paper of value. But the security element can also be applied all-over the surface of a document of value or object of value to be secured or in the form of a label or security strip of any desired form. It can be a self-supporting label or a transfer element, which is transferred from a prepared carrier foil onto the document of value or object of value by a transfer method, in particular hot stamping method.

As mentioned above, the security elements can be applied onto any objects of value, in particular documents of value, bank notes, passports, identification documents or the like. But also other objects of value, such as the packagings of high-quality products or high-quality products themselves, can be provided with such a security element.

BRIEF DESCRIPTION OF THE DRAWINGS

Further embodiments as well as advantages of the invention are explained in the following with reference to the Figures. For clarity's sake the figures do without a true-to-scale and true-to-proportion representation.

DETAILED DESCRIPTION OF THE INVENTION

Figure 1:
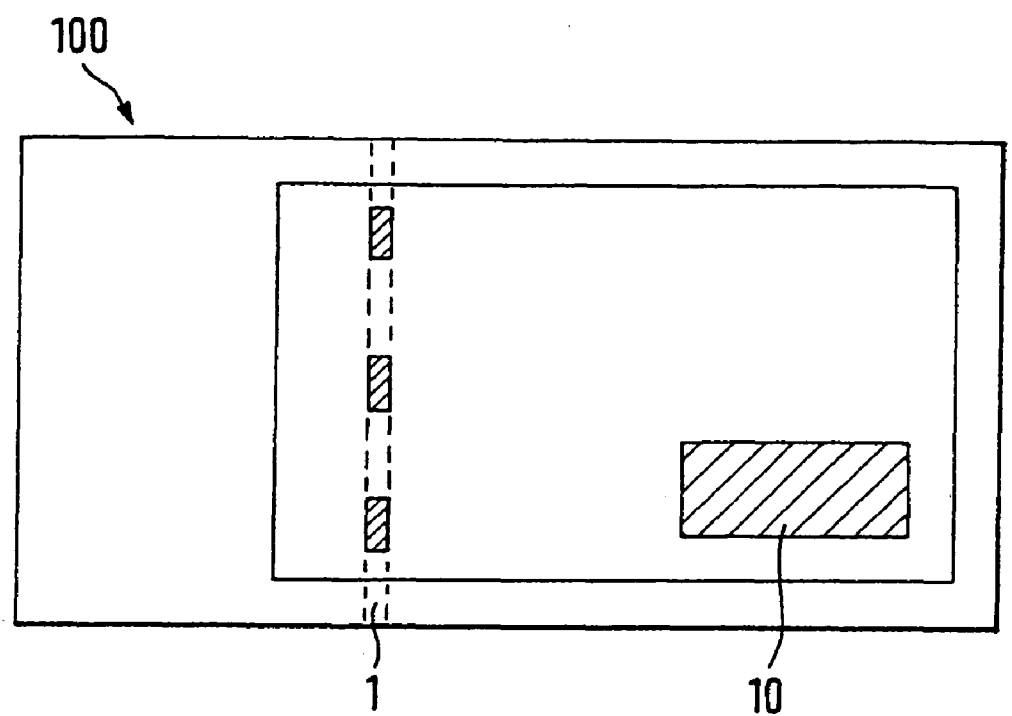
FIG. 1 shows a bank note according to the invention.

FIG. 1 shows a bank note 100, which is provided with at least one security element 10 according to the invention. The bank note of course can have further security elements, such as for example a security thread 1. FIG. 1 shows such a security thread 1 in the form of a so-called window security thread. A window security thread is characterized in that it is only partially embedded in the bank note paper and it comes to the surface of the bank note 100 in certain areas, the so-called windows, which are hatched in the Figure.

In the shown example the security element 10 is represented as a rectangular label. Of course it can also have any other form. For example, the security element 10 can be disposed in the form of a strip on the surface of the bank note 100, which extends over the entire width or length of the bank note 100. Alternatively, the security element 10 can have the form of a security thread and like the shown security thread 1 can be embedded as a window security thread in the bank note 100.

Figure 2:
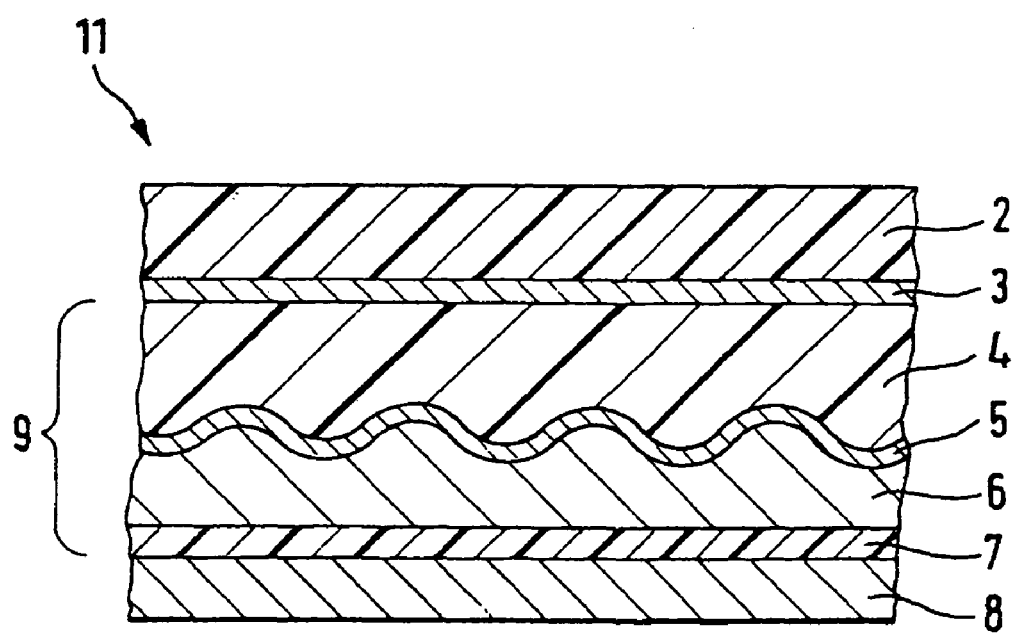
FIG. 2 shows a security element according to the invention in cross section.

FIG. 2 shows the cross section of a multilayer transfer element 11, which can be used as a security element 10. The transfer element 11 consists of a stable, self-supporting carrier foil 2, optionally a release layer or separation layer 3, an embossed foil 4, a first reflection layer 5, a protective lacquer layer 6, a second reflection layer 7 and an adhesive layer 8. The layers shown in FIG. 2 do not correspond to real relations in their proportions. They shall rather illustrate the basic scheme. In practice the layers 3 to 8 together have a thickness of about 50 micron. The carrier layer 2 has a layer thickness of 100 micron and more. This carrier layer is stripped off after the effect layer 9 has been transferred onto the document of value.

A foil material for a security element 10, which is used as a label material, has the same layer structure. In this case the carrier layer 2 is inseparably connected with the effect layer 9. This is why in this example a release layer 3 does not exist, or it is replaced by an adhesion promoter layer. The adhesive layer 8 can be covered by an additional protection layer, not shown in the Figure, such as for example silicone paper, which is removed before the transfer onto the bank note 100. From this transfer foil 11 the security elements 10 are punched out in the desired outline form and then are placed at an appropriate position on the bank note 100.

If the foil is to be used as a security thread material, the layer 8 usually will be made of a heat sealing lacquer. The layers 2 and 3, optionally, can be eliminated. In this case the transfer foil 11 is cut into threads of the desired width, which then are fed to the paper machine and are embedded in the security paper during the sheet formation process. This security paper then is further processed to the final bank notes 100.

Figure 3:
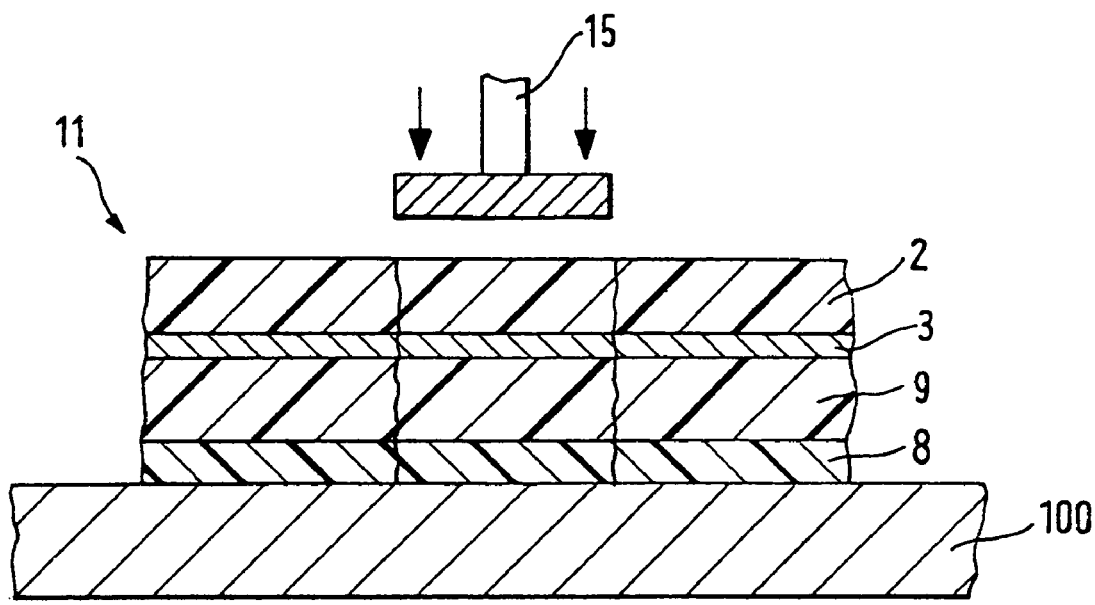
FIG. 3 shows the transfer of a security element according to the invention onto a document of value.

FIG. 3 shows the application of the security element 10 onto the document of value, or the bank note 100. As mentioned at the beginning, the foil 11 is formed as a transfer foil. It consists of a carrier foil 2, on which also the security-relevant effect layer 9 is disposed. In this case the effect layer 9 must be detachable in a relatively easy fashion from the carrier foil 2. For this purpose between the carrier foil 2 and the multilayer effect layer 9 a separation layer 3 can be disposed, if necessary. The effect layer 9 is also provided with an adhesive layer 8, preferably a hot-melt adhesive layer. For transferring the effect layer 9 onto the bank note 100 the transfer foil 11 is laid on the bank note 100 with the side of the adhesive layer 8. If the adhesive layer 8 is a hot-melt adhesive layer, then a specific area of the adhesive layer 8 is activated with the help of heat and pressure, which is indicated in FIG. 3 by the stamp 15. In this limited area, which conforms to the outline form of the respective security element, the adhesive layer 8 adheres to the bank note 100. When stripping off the continuous foil 11 the effect layer 9 severs in the edge area of the activated adhesive layer 8 and thus also remains on the bank note 100. The remaining areas of the effect layer 9 and the adhesive layer 8 remain on the carrier layer 2 and are removed from the bank note 100 without leaving any residues.

From this method for applying the security elements ensues, that the layer sequence of the effect layer 9 has to be applied in the reverse order on the carrier material, compared to the layer sequence as to be present in the finished product.

The basic variations of the security element 10 as shown in FIGS. 2 and 3 of course can also be applied on or incorporated in other documents of value, such as for example ID cards, checks, tickets etc. Likewise, the security elements 10 can be used for the protection of any other objects equivalent to money and for the product protection of any goods and their packagings.

The security-relevant effect layer 9 in FIGS. 2 and 3 can have, as mentioned above, a multilayer form. Beside the security-relevant layer structure according to the invention it can also have further security features, such as for example a luminescent and/or magnetic and/or thermochromic and/or electrically conductive layer.

In the following special embodiments of the security-relevant layer structures according to the invention are explained, which alone or in combination with further security features form the effect layer 9. The layer sequences which result from the different purposes of use or application techniques, such as label material or transfer material, are not taken into consideration.

EXAMPLE 1

FIG. 4, 5

Figure 4:
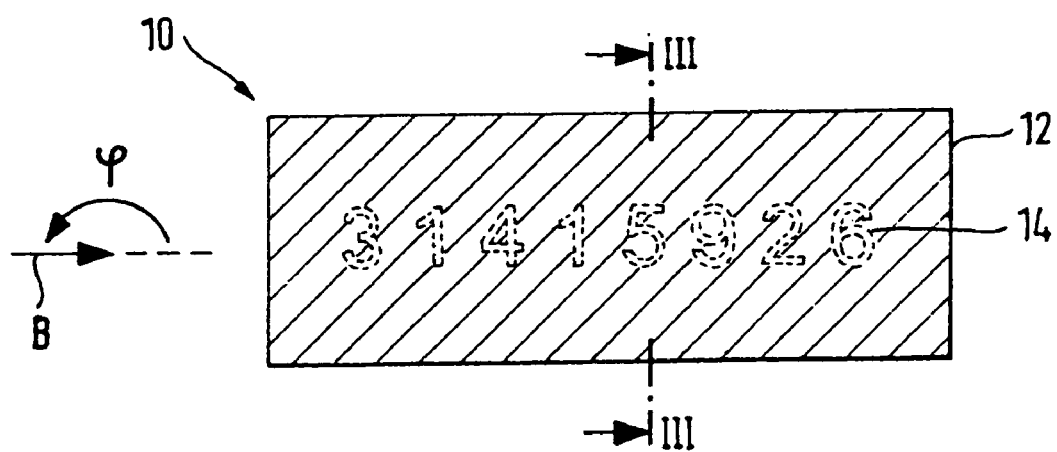
FIG. 4 shows a schematic representation of an embodiment of the security element according to the invention in top view.
Figure 5:
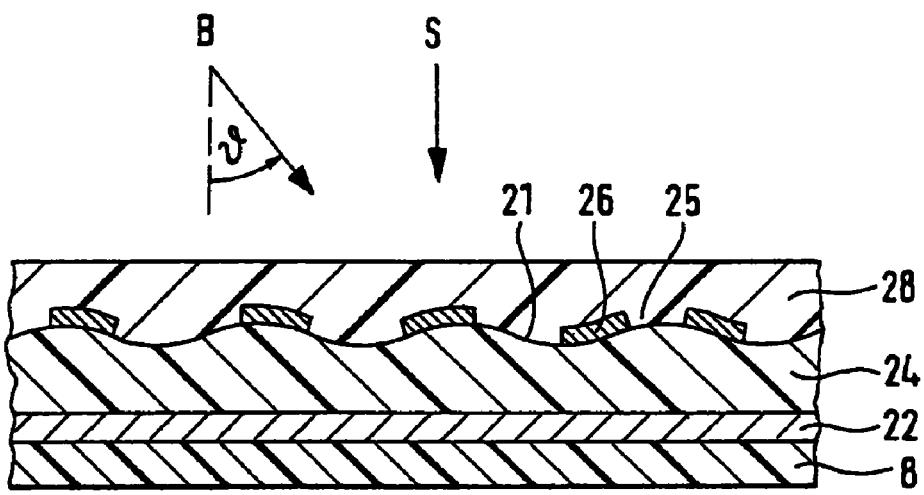
FIG. 5 shows the schematic structure of a security element according to the invention in cross section.

FIGS. 4 and 5 show an embodiment of the security element 10 in plan view and in cross section, wherein the security element 10 has only one self-contained area 12 with a diffraction structure. As already explained, the specific design of this diffraction structure is irrelevant for the invention. Essentially, the diffraction structure has to have viewing angles wherein the diffractive effect is reconstructed on the incidence of light, while under other viewing angles this diffractive effect is not perceptible or only diffusely perceptible. Arrow B in FIG. 5 here stands for the viewing angles wherein the diffractive effect is recognizable. I.e., upon viewing the area 12 in a narrow angle range around this predetermined viewing direction B the viewer perceives the diffractive effect produced by the diffraction structure, while under other viewing angles this diffractive effect is not perceptible or only diffusely perceptible.

The viewing direction B of the security element 10 shown in FIGS. 4 and 5 can be specified as viewing angle θ=−45 degree. For clarity's sake, as already mentioned at the outset, it is assumed, that the diffractive image is reconstructed under oblique viewing angles, while upon perpendicular viewing S it is not or only diffusely perceptible.

This area 12 according to the invention has subareas 14, which are only recognizable when viewed under the same viewing angles, under which the diffractive effect is reconstructed on the incidence of light. In the shown example this is the case upon oblique viewing along arrow B. Upon viewing under viewing angles, wherein the diffractive effect is not reconstructed on the incidence of light, which here is upon perpendicular viewing, the subareas 14 do not form a dominant contrast to their surroundings and therefore cannot be perceived or only faintly perceived. Therefore, in FIG. 4 the subareas 14 are represented by dashed lines. In the shown example the information represented by the subareas 14 is the 8-digit serial number of the bank note 100.

In FIG. 5 the security element 10 is shown in cross section along the line III-III. In the present example the security element 10 is formed as an embossed hologram. It therefore comprises two transparent plastic layers 24, 28, the boundary area of which has the form of the embossed diffraction structure 21. In which of the plastic layers 24, 28 the diffraction structure 21 is actually embossed, depends on the continuous foil 11 (label material or security thread material or transfer foil) used for the application of the security element 10.

The embossed diffraction structure 21 is provided with a reflection layer 26, preferably a metal layer, which has gaps 25. The gaps 25 here have the form of the serial number as shown in FIG. 4 by dashed lines. The opposite surface of the plastic layer 24 is also provided with a reflection layer 22, which has substantially the same reflecting properties as the reflection layer 26. Preferably, for the two reflection layers 22, 26 the same metals, such as for example aluminum, are used.

The plastic layers 24, 28 are selected such that they have a refractive index as similar as possible, so that in the intermediate areas 25 which are free of reflection layers the diffractive effect disappears. Preferably, the plastic layers 24, 28 therefore are made of the same plastic material.

Upon viewing this security element 10 from directions under which no diffractive image is reconstructed, e.g. upon perpendicular viewing (direction S), first of all the viewer perceives the reflecting properties of the reflection layers 22, 26. In the gaps 25 the reflection layer 22 therebelow is visible. If the reflection layers 22, 26 are made of, for example, aluminum, the viewer upon perpendicular viewing perceives the security element 10 as a structureless, glossy area. Upon viewing from directions, under which a diffractive image is reconstructed, here upon oblique viewing (direction B), the gaps 25 form defective spots in the reconstructed diffractive image. The information content of the gaps to the viewer appears as a dark information against an otherwise bright diffractive image.

The gaps 25 and the reflection layer 22 therebelow in their cooperation form the subareas 14 according to the invention. The gaps 25 preferably are produced not until the security element 10 is applied onto the bank note 100. I.e., the foil used for the security element 10 has two continuous reflection layers 22, 26. When the security element 10 has been transferred in the desired outline form onto the bank note 100, then the gaps 25 are produced in the form of the serial number represented by the subareas 14 according to FIG. 4. This is preferably effected with the help of a laser, which removes the metal layer 26 in the respective areas. This is obtained by focusing the laser beam onto the plane of the metal layer 26 and deflecting the laser beam in x and y direction according to the pieces of individual information to be produced. The high absorption coefficient of the metal has the effect that the laser energy vaporizes the metal. The metal oxidizes nearly instantaneously. Since these metal oxides are nearly transparent, the areas subjected to the laser energy afterwards appear as transparent areas in the metal layer. By selectively controlling the laser beam energy and the time of action there can be prevented, that the second metal layer 22 is affected.

In this way every bank note can be provided in a simple and quick way with an information individualizing the bank note, such as the serial number, in one of the last manufacturing steps.

If the subareas 14 are to represent an information individualizing a larger number of documents of value, such as for example the denomination of the bank note, then also other methods for producing the gaps 25 can be used. In this case the gaps 25 can be produced already during the manufacturing of the continuous foil, for example by etching or washing methods. It is obvious that for this laser marking methods can also be used.

EXAMPLE 2

FIG. 4, 5

According to a further embodiment of the invention the security element 10 has the layer structure as shown in FIG. 5. However, in this case the reflection layer 22 is made of a material contrasting to the reflection layer 26, preferably of a differently colored metal. If the reflection layer 26 is an aluminum layer, for the reflection layer 22 for example a copper layer can be used. In this case due to the different colors of the two reflection layers 22, 26 upon perpendicular viewing to the viewer the gaps 25 appear as a not diffractive contrast image. The viewer therefore can recognize the information content of the contrast image, in the present example the serial number, even upon perpendicular viewing as copper-colored areas against a silver background. Since the layer 24 is relatively thin, the viewer gets the impression that the gaps 25 are filled with a different material, in the present case copper. Moreover, as already explained in the above example, the gaps 25 upon oblique viewing are recognizable as a dark information against a bright diffractive image. This conformity between the not diffractive pieces of information recognizable upon perpendicular and oblique viewing increases the value of the individual data and can be used as an authenticity feature.

Instead of copper of course also other reflecting metal layers, such as for example gold layers or nickel layers, can be used. Other contrasting materials, such as printed layers, for example metallic printed layers, are possible.

EXAMPLE 3

FIG. 6, 7

Figure 6:
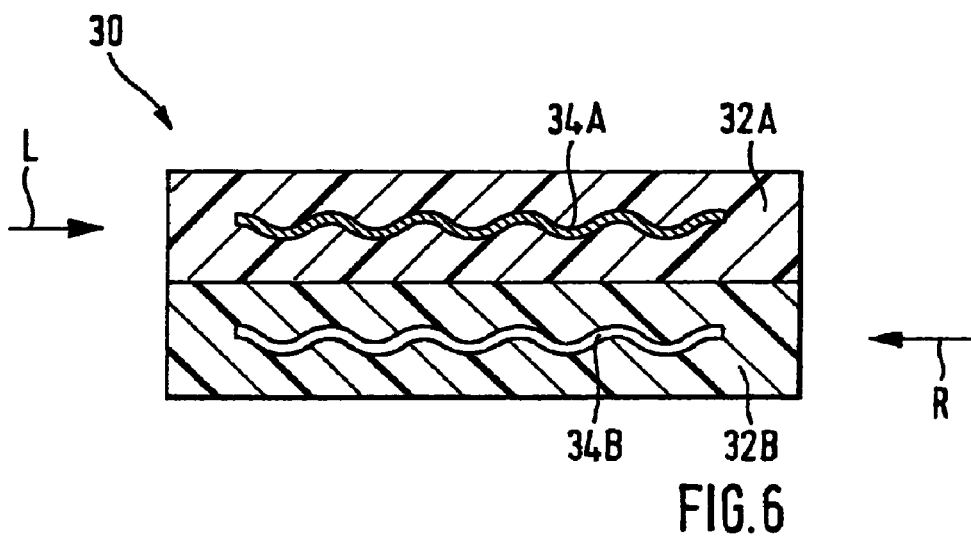
FIG. 6-11 show further embodiments of the security element according to the invention in top view.
Figure 7:
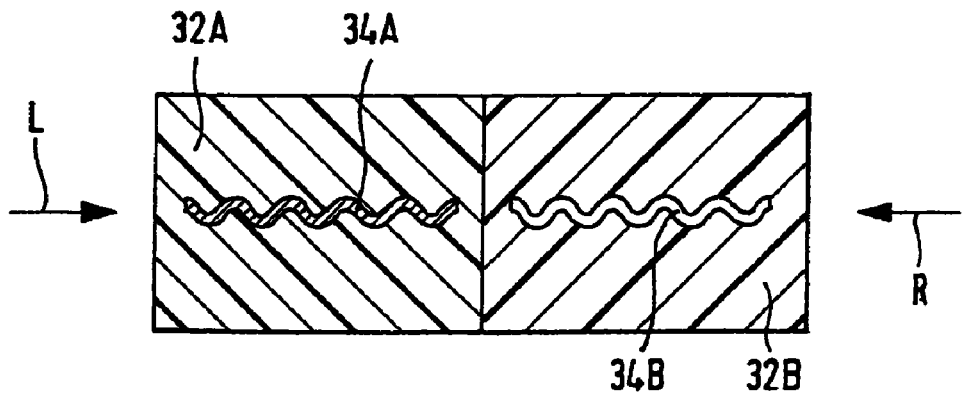

FIGS. 6 and 7 show further embodiments of the security element according to the invention in top view. These security elements are characterized in that they have two self-contained areas, which preferably directly adjoin each other.

FIG. 6 shows a security element 30, which has two rectangular areas 32A, 32B disposed one above the other, both having a diffraction structure. The image contents reconstructed by the respective diffraction structures can be identical for the two areas but they may also differ from each other. In any case the viewing angles of the diffraction structures disposed in the areas 32A, 32B have to differ from each other. In the shown example the diffraction structure disposed in the area 32A is only recognizable upon oblique viewing from the left (arrow L), while the diffraction structure disposed in the area 32B is recognizable only upon oblique viewing from the right (arrow R). According to the invention the areas 32A, 32B have pieces of individual information 34A, 34B, which in FIG. 6 and the following Figures are schematically represented by sinuous lines. The information represented by the subareas 34A, 34B can be identical for the two areas 32A, 32B or different. For example, it is conceivable, that the subareas 34A represent the first four numbers of the 8-digit serial number, while the subareas 34B represent the second four numbers of this serial number. But it is also possible to provide the complete, identical serial number in both areas.

If the layer structure corresponds to the example 1, upon perpendicular viewing of the security element the subareas 34A, 34B will not be recognizable. Upon oblique viewing from the left the viewer perceives the information represented by the subareas 34A against the diffractive surroundings of the area 32A, while upon viewing from the right he only recognizes the information of the area 32B represented by the subareas 34B. These pieces of partial information represented by the subareas 34A, 34B can correspond to the serial number printed in the usual form and therefore can be compared to this.

As in example 2 the subareas 34A, 34B upon perpendicular viewing can have a color contrasting to the surroundings. In this case upon perpendicular viewing of the security element 30 both the information represented by the subareas 34A and the information represented by the subareas 34B are clearly recognizable. Upon oblique viewing from the left, however, the information represented by the subareas 34A emerges against the reconstructed diffractive image of the area 32A in a clearly contrasting fashion, while upon oblique viewing from the right the information represented by the subareas 34B dominates. If the pieces of information represented by the subareas 34A, 34B complement each other, as mentioned above, to form the serial number, upon perpendicular viewing the complete serial number will be recognizable and can be compared with the numerical blocks recognizable upon oblique viewing from the left or upon oblique viewing from the right.

FIG. 7 shows a variation of the embodiment according to FIG. 6, wherein the two areas 32A and 32B are disposed side by side. If in the areas 32A and 32B pieces of partial information are provided, this embodiment is especially suitable, because the pieces of partial information as usual are disposed in a row side by side.

EXAMPLE 4

FIG. 8

Figure 8:
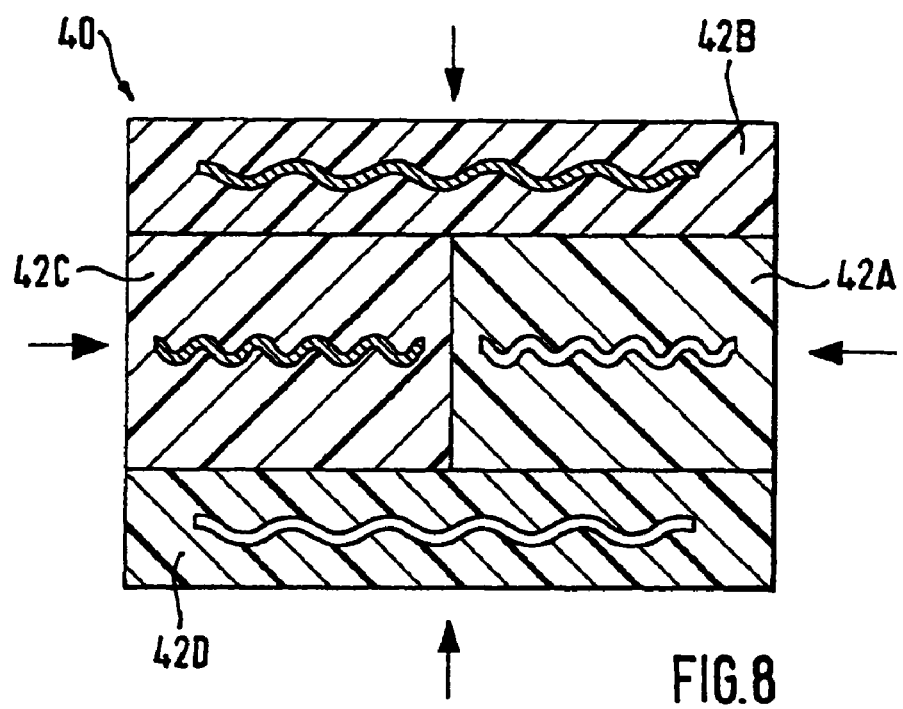

FIG. 8 shows a further variant of the security element explained in connection with FIGS. 6 and 7. In this case the security element 40 has a plurality of the diffractive areas in the form as already explained. In this specific example four rectangular areas 42A-42D are represented, which are disposed side-by-side or one beneath the other. Here too the viewing angles of the diffraction structures disposed in the areas 42A-42D differ from each other. The viewing directions associated with the individual areas 42A-42D are indicated in the FIG. 8 by the arrows. I.e., by tilting and/or rotating the security element 40 or the bank note 100 successively the individual diffractive images of the areas 42A-42D and the subareas disposed in the respective areas are recognizable.

The oblique viewing angles for the areas 42A-42B here are, for example, −45 degree, −15 degree, +15 degree, +45 degree. If a viewer holds the bank note 100 containing the security element 40 under an angle of −45 degree obliquely to the left and tilts the bank note in 30 degree-steps via −15 degree and +15 degree to +45 degree towards the right, he successively recognizes the pieces of information represented by the subareas against the respectively reconstructed diffractive images of the areas 42A-42D.

Here too all pieces of information represented by the subareas can be visible upon perpendicular viewing. Likewise, all pieces of information can be identical or connected to each other with regard to any content.

EXAMPLE 5

FIG. 9

Figure 9:
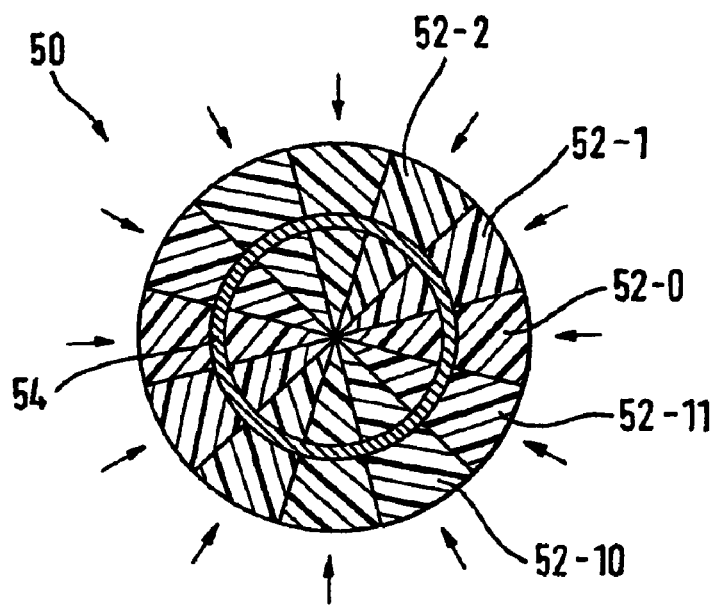
Figure 10:
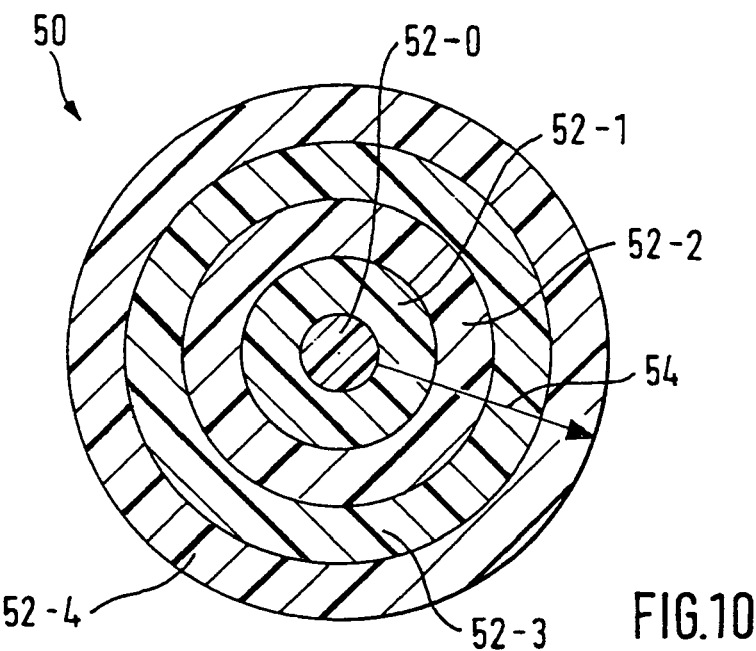

FIGS. 9 and 10 illustrate that the areas provided with the diffraction structures or subareas not necessarily have to have a rectangular form. For example in FIG. 9 a circular-disk-shaped security element 50 is shown, which has 12 areas according to the invention 52-0 to 52-11, each forming a circular segment of the circular disk. The viewing angles of the diffraction structures disposed in the individual areas 52-0 to 52-11 are selected such, that the diffractive images reconstructed by the respective diffraction structures become successively recognizable for the viewer when rotating the security element 50. In the shown embodiment the oblique viewing angles are e.g. −30 degree, −25 degree, −20 degree, −15 degree, −10 degree, −5 degree, 0 degree, 5 degree, 10 degree, 15 degree, 20 degree, 25 degree, wherein the viewing angle −30 degree (i.e. 30 degree tilted to the left) applies to the middle bottom field 52-8, and the viewing angle −25 degree (i.e. 25 degree tilted to the left) applies to the field 52-7 to the left of it. The specified angles are allocated to the segments in a clockwise fashion, so that to the field 52-10 is allocated the viewing angle +25 degree (i.e. 25 degree tilted to the right).

Obviously, there are many possibilities to make the circle segments flash diffractively one behind the other when tilting or rotating them, e.g. fields can be occupied such that when illuminated obliquely from the front and upon perpendicular viewing the fields flash successively in the plane when rotating the security element. In this case an asymmetric profile of the grating is required, since with a symmetric profile opposite fields, the grating occupancy of which is rotated by 180 degree, would flash simultaneously. The asymmetric profile ensures, that only one field flashes, while the remaining fields remain dark.

In the shown example the subareas incorporated in the individual areas 52-0 to 52-11 are disposed along a ring 54. The pieces of information represented by the subareas can be of any design. One expedient variant could be to design the subareas such that from the different viewing directions for example different characters or letters are perceived, which complement each other to form one word, or different words or syllables, which complement each other to form a sentence. But it is also possible to repeat the same information in each circular segment.

EXAMPLE 6

FIG. 10

A different division or geometry of the hologram areas is shown in FIG. 10. In this case the security element 50 is composed of ring-shaped areas 52-0 to 52-4, which are disposed in a concentric fashion to each other. Here the diffraction structures of the individual areas 52-0 to 52-4 are designed such that the pertinent diffractive image contents are reconstructed when the security element 50 is tilted. The pieces of information incorporated into the individual ring-shaped areas accordingly can be perceived under different tilting angles. With a such designed embodiment so-called pumping effects can be realized, wherein the pieces of information represented by the subareas seem to run from the circle center across the whole circle radius in an outward direction and/or back again. This motion is indicated in FIG. 10 by the arrow 54.

EXAMPLE 7

FIG. 11, 12

Figure 11:
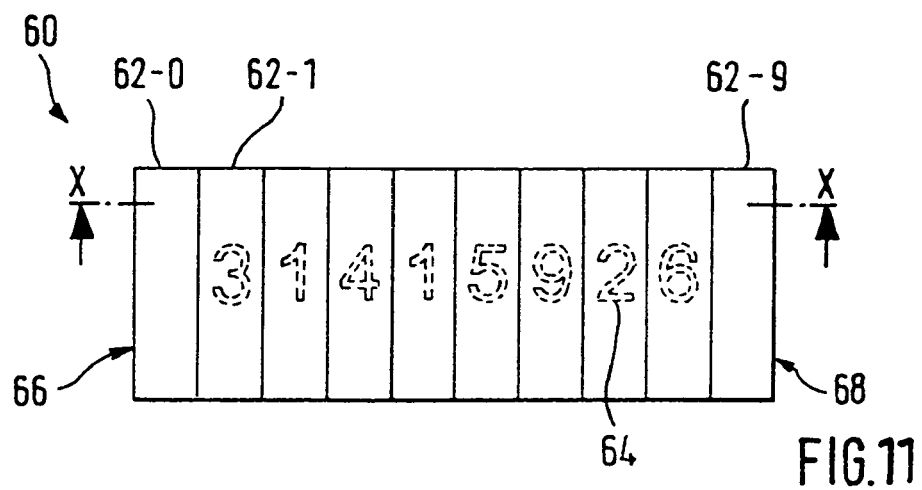
Figure 12:
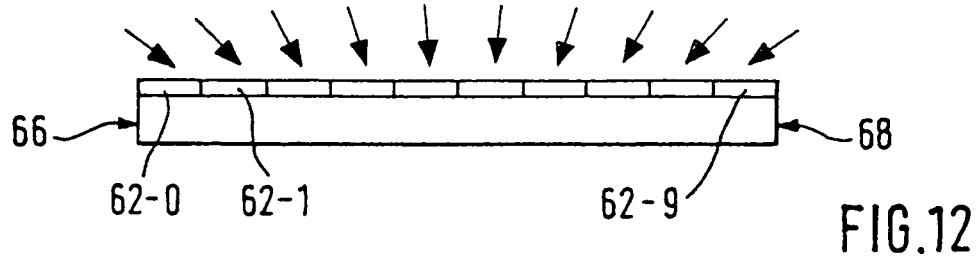
FIG. 12 shows the cross section through the security element according to FIG. 11 along the line X-X, FIG. 13, 14 show further embodiments of the security element according to the invention in top view.

FIGS. 11 and 12 show a further embodiment of the security element 60 according to the invention in plan view or in cross section. This security element 60 has 10 strip-shaped areas 62-0 to 62-9 disposed side by side, the viewing angles of which starting at the edge 66 of the security element increase towards the center and decrease respectively from the center towards the opposite edge 68. This is schematically shown in FIG. 12 by the arrows. By tilting the security element 60 for the viewer the diffractive images of the strips 62-0 to 62-9 and the subareas incorporated therein become recognizable one after the other. For example, a written serial number 64, as shown in FIG. 12 in plan view, can be integrated into the areas 62-1 to 62-8 such that when tilting the security element the serial number can be read number by number and can be compared with a digit string applied in normal print at a different position on the bank note 100.

While in the FIGS. 11 and 12 for simplicity's sake only 10 strips 62-0 to 62-9 are shown, it is obvious, that a larger number of strips can be used, so as to obtain, for example when tilting the security element 60, a continual transition between the diffractive images visible respectively.

All hitherto explained examples have in common, that the areas provided with the diffraction structures are self-contained and have an extent, which can be resolved with the naked eye. If in all hologram areas the same information is integrated, an identification of the individual areas can be omitted entirely or to a far extent. If in the hologram areas different pieces of information, such as the digits of the serial number, are integrated, for the incorporation of the individual information a simple detector device will be sufficient, since the demands for the optically resolution of the relatively large-surface hologram areas are not high.

EXAMPLE 8

FIG. 13, 14

In the examples described in the following the individual areas consist of a plurality of partial areas, the dimension of which cannot be resolved with the naked eye. All partial areas belonging to a hologram area contribute to the reconstruction of the diffractive image associated with the respective area.

Figure 13:
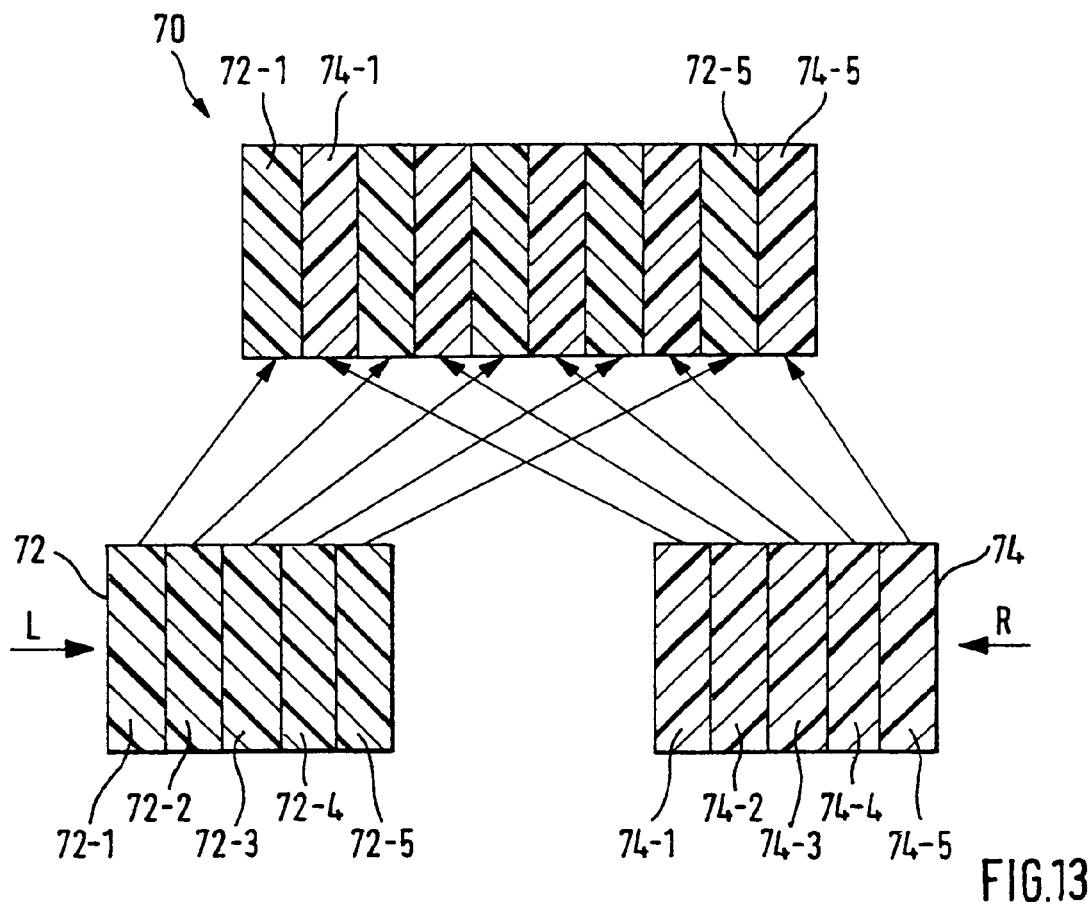

This principle is schematically shown in FIG. 13. The hologram area 72 upon oblique viewing from the left (arrow L) reconstructs a first diffractive image and the hologram area 74 upon oblique viewing from the right (arrow R) reconstructs a second diffractive image. These hologram areas 72, 74 are divided into strip-shaped partial areas 72-1 to 72-5 or 74-1 to 74-5. These partial areas according to the embodiment have a width of merely about 50 micron and cannot be resolved with the naked eye. For the final security element 70 these partial areas 72-1 to 72-5 or 74-1 to 74-5 of the hologram areas 72, 74 are interlaced into each other. In the shown example they are disposed alternatingly, so that the partial area 72-1 of the hologram area 72 is followed by the partial area 74-1 of the hologram area 74 etc.

Upon obliquely viewing the security element 70 from the left only the partial areas 72-1 to 72-5 contribute to the reconstruction of a diffractive image and the viewer perceives the first hologram 72. Upon obliquely viewing the security element 70 from the right, vice versa, only the partial areas 74-1 to 74-5 contribute to the reconstruction of a diffractive image and the viewer recognizes the second hologram 74. Although the individual partial areas 72-1 to 72-5 or 74-1 to 74-5 are disposed separated from each other, the holograms 72, 74 recognizable under the respective viewing angles appear coherent to the viewer which is due to the narrow width and the small distance between the partial areas. With respect to content the first and second hologram may reconstruct the same or different diffractive images. It is obvious that the respective hologram areas can have any number of partial areas 72-1 to 72-*m* or 74-1 to 74-*m*. The widths of the partial areas of the different holograms not necessarily have to be identical. The manufacturing of the strip-shaped partial areas can be effected, for example, with the help of a line mask, which when exposing a diffractive recording medium covers the part of the recording medium not to be exposed at the time. Alternatively, the strips can also be directly produced by suitably directing an electron beam in a recording medium. The number of partial areas or strips can be selected in any desired fashion. With a strip width of e.g. 50 micron and a length of the security element 70 of e.g. 50 millimeter the element comprises 1000 strips disposed side by side.

According to the invention in the areas 72, 74 pieces of individual information, not represented in FIG. 13, are incorporated in the form of subareas, which neither take part in the image reconstruction in the direction of L nor in the image reconstruction in the direction of R.

Here it is assumed, that the specific layer structure of the security element 70 corresponds to the already explained layer structure according to FIG. 5. Preferably, in all partial areas 72-1, 74-1 to 72-5, 74-5 the same information is incorporated in the form of the subareas according to the invention, so that the production of the subareas, as explained above, can be effected without a high detection effort and with devices suitable for the mass production. In this case, as explained in detail in the following, from the two viewing directions the same dark individual information appears against the otherwise bright respective holographic image background.

Figure 14:
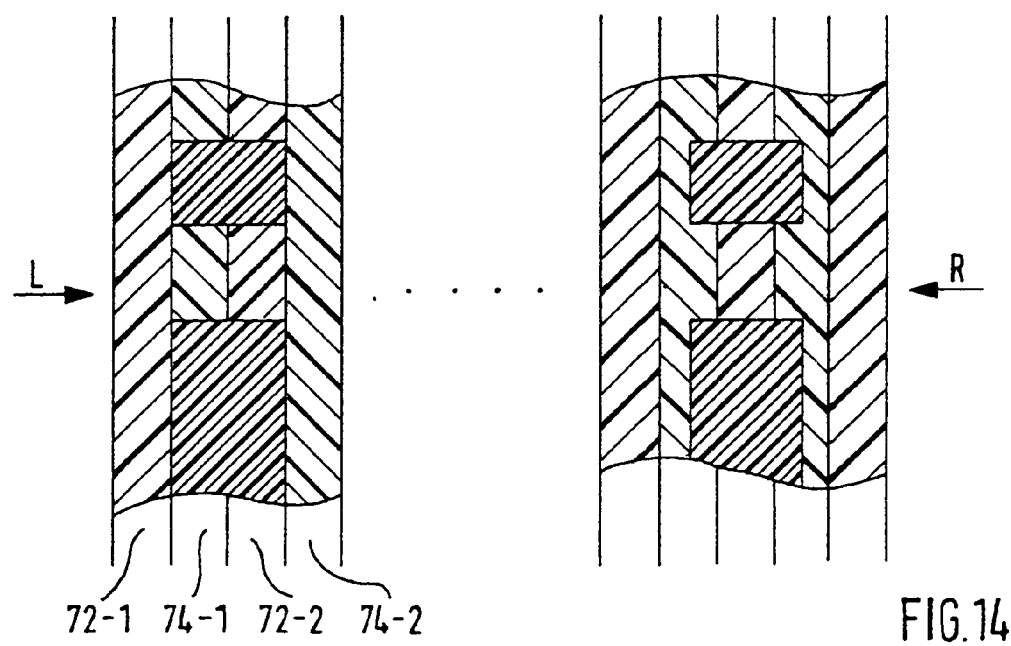

FIG. 14 shows the security element 70 according to FIG. 13, in which for the purpose of illustration some subareas 76 are schematically indicated. It is understood, as already explained above, that a complete information, for instance a serial number with a width of a plurality of centimeters, consists of a plurality of such subareas 76.

Essential is also that the line width of the individual information, if it is to be recognizable in the two partial areas, in the event that all strips have identical widths, must have at least twice the strip width. Since the eye integrates the parts of the lines that are distributed across different strips, it is irrelevant, whether the lines cover the strips in their complete width or only partially. In both cases the visual impression will be the same. Both extremes are shown in FIG. 14 by way of example with reference to the letter "i". If one takes into account, that with a strip width of e.g. 50 micron and a preferred line width of 0.5 millimeter for a line of the individual information, ten strips are captured per partial areas, it becomes clear, that it is unimportant how the strips are "hit" when incorporating the individual information.

I.e., with the described design the information represented by the subareas 76 can be written without alignment to the edges of the partial areas, i.e. with a low apparative and time effort, and from the two viewing directions the same information is recognizable.

It is understood, that there can be provided more than two hologram areas having diffractive images recognizable under different viewing conditions, wherein the partial areas associated with the respective diffractive images are respectively interlaced into each other. I.e. the width of the subareas has to be respectively adjusted, so as to being able to write the information represented by the subareas without alignment to the edges of the partial areas.

EXAMPLE 9

FIG. 15

Figure 15:
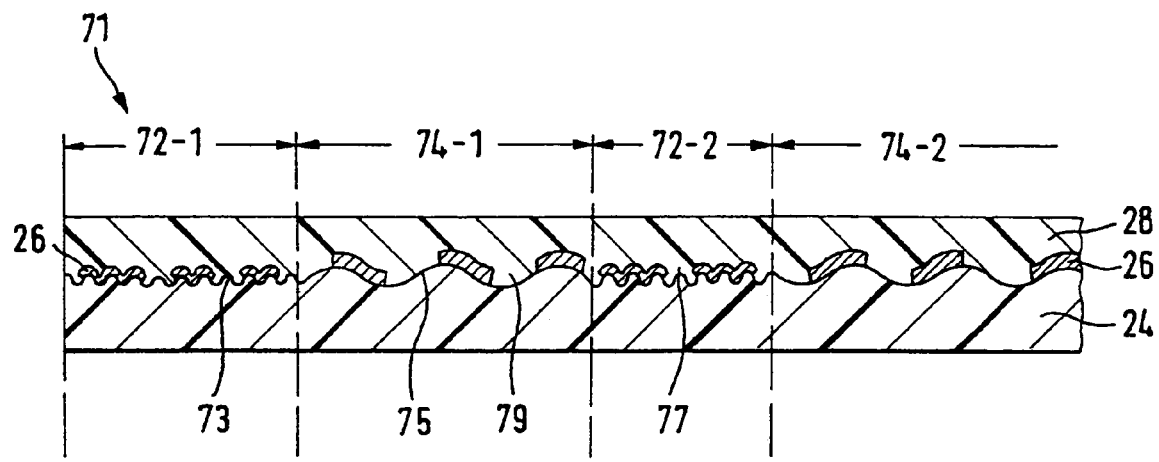
FIG. 15 shows the schematic layer structure of the security element according to FIG. 13, 14 in cross section.

FIG. 15 shows a further embodiment of the invention in cross section. In principle, the structure of this security element 71 corresponds to the security element 70 represented in FIG. 13. I.e., it has two hologram areas 72, 74 interlaced into each other, which under different viewing angles reconstruct different diffractive images. The subareas not contributing to the diffractive construction in this case are not formed by the cooperation of two reflection layers, but solely by gaps in the first reflection layer.

FIG. 15 shows a detail of the security element 71 which is formed as an embossed hologram in cross section (not true-to-scale). The alternatingly disposed partial areas 72-1, 74-1, 72-2, 74-2 are shown. According to the invention the partial areas 72-1, 72-2 differ from the partial areas 74-1, 74-2 with respect to the diffraction structures disposed therein. The fringe range between the plastic layers 24, 28 in the partial areas 72-1, 72-2 is provided with a first diffraction structure 73, while the partial areas 74-1, 74-2 have a second diffraction structure 75. The entire fringe range between the plastic layers 24, 28 is provided with a reflection layer 26, which in the partial areas 72-1, 72-2 has gaps 77 and in the partial areas 74-1, 74-2 has gaps 79. This reflection layer 26 preferably is a thin metal layer, such as for example an aluminum layer. The gaps 77, 79 represent the subareas associated with the respective hologram areas 72, 74. The pieces of information represented in this way can be identical or different.

This security element 71 in particular is suitable for protecting translucent or transparent objects of value. Because the gaps 77, 79 upon viewing in transmitted light are recognizable as bright, high-contrast areas against the dark appearing reflection layer 26. If one assumes that the gaps 77, as already explained several times, represent the first digit string of a serial number and the gaps 79 the second digit string, in transmitted light the viewer recognizes the entire serial number. Upon oblique viewing of the security element 71 from the left, however, he only recognizes the first digit string incorporated in the form of gaps 77 in the hologram area 72. Upon oblique viewing from the right the viewer perceives the second digit string provided by the gaps 79 in the hologram area 74. In this way, by comparing the pieces of information recognizable under the different viewing angles, conclusions can be drawn as to the authenticity of the object of value.

EXAMPLE 10

FIG. 16

Figure 16:
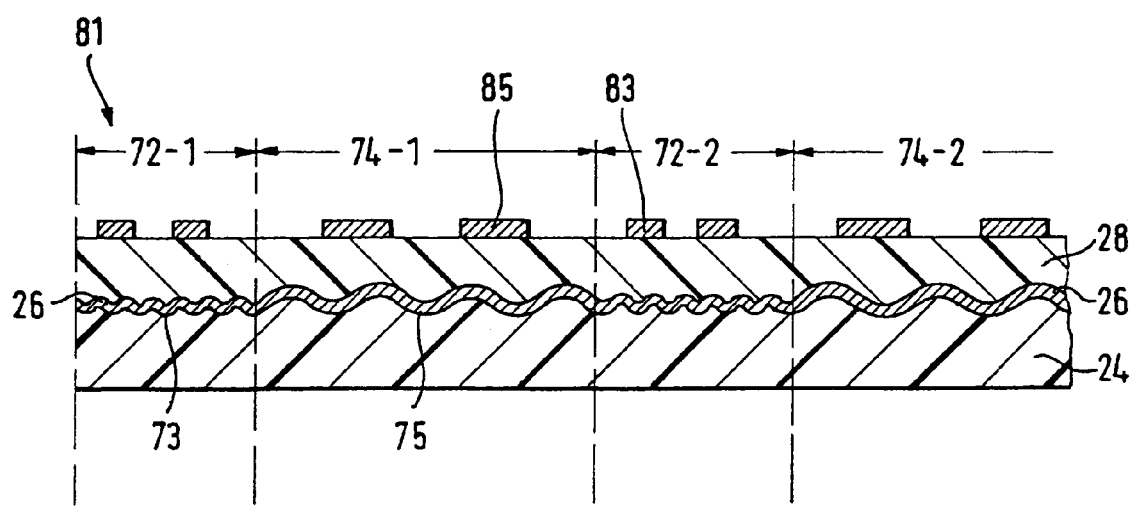
FIG. 16 shows a variant of the layer structure of the security element in cross section.

FIG. 16 shows a further embodiment of the security element according to the invention of FIG. 13 in cross section. The shown security element 81 is an embossed hologram, wherein corresponding to the different partial areas 72-1, 72-2 or 74-1, 74-2 different diffraction structures 73, 75 are disposed. In contrast to the example represented in FIG. 15 the reflection layer 26 of this example is present all-over and preferably is made of a metal layer, in particular an aluminum layer. For producing the subareas the plastic layer 28 is printed in the relevant partial areas with a printing ink, which preferably has substantially the same reflecting properties as the reflection layer 26. If the reflection layer 26 for example is formed by a silvery aluminum layer, for the printing ink of the printed layers 83, 85 a silvery metallic printing ink, such as for example Supersilver, is used. Since the printing ink used for the printed areas 83, 85 substantially has the same reflecting properties as the reflection layer 26, the printed areas 83, 85 are not recognizable upon perpendicular viewing of the security element 81. Upon oblique viewing from the left, however, the printed areas 83 disposed in the partial areas 72-i of the hologram area 72 do not contribute to the reconstruction of the hologram 72, so that the printed areas 83 are recognizable as dull areas in the hologram 72. Analogously, upon oblique viewing from the right only the printed areas 85 disposed in the partial areas 74-i of the hologram area 74 are recognizable. In this case again the printed areas 83, 85 may represent an identical information or different pieces of information. Likewise, as in the example already described, there can exist a connection in content between the pieces of information represented by the printed areas 83, 85.

Alternatively, the printed images 83, 85 can be produced directly on the reflection layer 26, so that they are disposed intermediate between the plastic layer 28 and the reflection layer 26. This, however, has to be effected in an earlier procedure step, i.e. the advantage, to write data in the finished security element, would then be eliminated.

It is obvious that the security elements 71, 81 represented in the FIG. 15, 16 can have further hologram areas, which are respectively interlaced with the hologram areas 72, 74.

EXAMPLE 11

FIG. 17

Figure 17:
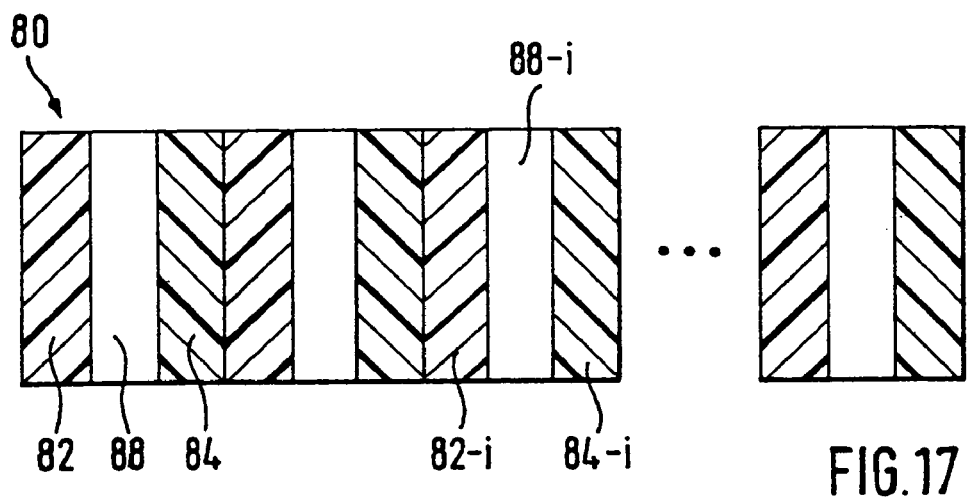
FIG. 17-19 shows further variations of the security element according to the invention in top view.

A further embodiment of the invention is shown in FIG. 17. The security element 80 displayed therein beside the two hologram areas 82, 84 according to the invention, which are provided with diffraction structures of different viewing angles, has a third diffractive image area 88. The hologram areas 82, 84, 88, as already explained with reference to FIG. 13, are divided into a plurality of partial areas 82-i, 84-i, 88-i, which are disposed in an interlaced fashion. The hologram areas 82, 84 have the subareas according to the invention, which can be designed according to the examples already explained with reference to the FIGS. 5, 15 and 16. The hologram area 88 however has no subareas and is recognizable under a viewing angle differing from that of the hologram areas 82, 84. The viewer of this security element 80 upon oblique viewing from the left first of all recognizes the diffractive image reconstructed by the partial areas 82-i, while upon oblique viewing from the right first of all he recognizes the diffractive image reconstructed by the partial areas 84-i. The partial areas 88-i also complement each other to form a diffractive image, which in particular upon perpendicular viewing of the security element emerges in the foreground.

This variant has the advantage, that the hologram areas 82, 84 provided with the subareas can be designed very simple, when the additional hologram area 88 reconstructs an elaborate and at the same time esthetically attractive diffractive image. I.e., upon an almost perpendicular viewing, as in the known security elements, the viewer recognizes a complicated hologram provided with complex diffractive effects. The hologram areas 82, 84, however, can reconstruct, for example, a simple, colored area, in which is recognizable the information represented by the subareas. Upon oblique viewing from the left the viewer sees, for example, again the first digit string of the serial number in a red environment, and upon oblique viewing from the right the second digit string in an also red or a differently colored environment.

This embodiment, however, has the disadvantage, that for writing the pieces of individual information, as it is the case with the prior art, the respective strips have to be identified, before the partial elements of the individual information can be written.

EXAMPLE 12

FIG. 18

Figure 18:
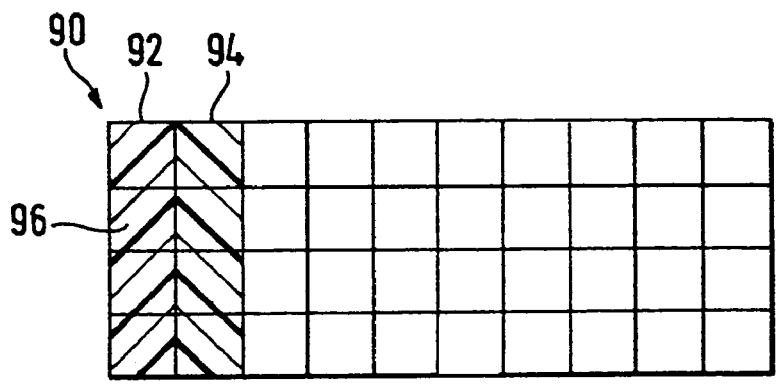

FIG. 18 illustrates an advantageous production method for the areas according to the invention having the respective diffraction structures.

The security element 90 shown in FIG. 18 by way of example is formed like the security element 70 shown in FIG. 13 out of a plurality of alternatingly disposed partial areas 92, 94. Each of the partial areas 92, 94 is composed of a plurality of uniform, in the embodiment quadratic pixel elements 96. The partial areas 92, 94 are composed of quadratic pixel elements having the edge length of 50 micron. The viewing angles of the pixel elements allocated to the partial areas 92, 94, however, differ from each other with respect the diffractive image to be reconstructed. The viewing angle of the partial areas 92 can be, for example, −45 degree, while the viewing angle of the pixel elements allocated to the partial areas 94 is +45 degree. I.e., the tilting angle under which the diffractive images associated with the partial areas 92, 94 are recognizable, amounts to 45 degree, while the reconstruction angles within the plane of the security element 90 differ from each other by 180 degree.

Due to the smallness of the individual pixel elements 96 hologram areas of any desired form can be composed, for example the circle segments of the security element 50 according to FIG. 10 or the simple, rectangular partial areas of the security element 40 according to FIG. 9.

The pixel elements 96 can be produced by machine, for example, according to the so-called dot matrix method in large numbers and cost-effective. It may occur, however, that the area boundaries of the individual pixel elements 96 cannot be reproduced conforming to their ideally exactly straight extending edge. In particular, area boundaries or area edges extending in a bent fashion have to be formed with the help of very finely graduated procedure steps in the dot matrix method. Due to the small size of the pixels and the limited resolution ability of the eye the visually perceived impression, however, is hardly affected thereby.

EXAMPLE 13

FIG. 19

Figure 19:
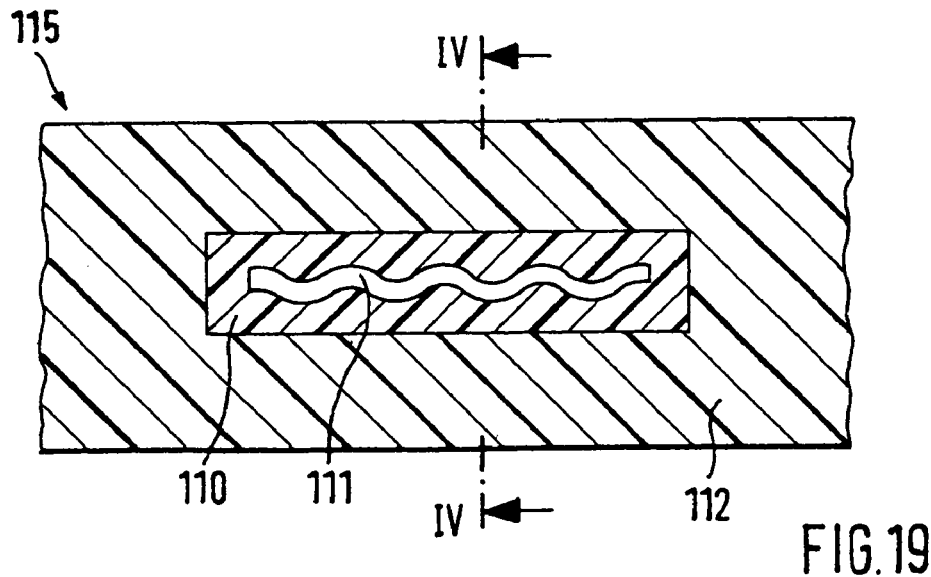

A further embodiment of the invention is explained with reference to the FIG. 19. This security element 115 has an area 110 according to the invention with a diffraction structure, which under an oblique viewing angle reconstructs a diffractive image. This area 110 has subareas 111, which for example can represent an individualizing information. This area 110 is embedded in a surrounding 112, which also has optical diffraction structures. The diffractively reconstructed image of this surrounding hologram 112 is visible under a viewing angle that differs from that of the image of the area 110, preferably the diffractive image reconstructed by the area 112 is visible upon an almost perpendicular viewing.

By the superficial embedding in a diffractive environment 112 the diffractive area 110 provided with the subareas 111 in a way is disguised. Here too the surrounding hologram 112 can be designed as an elaborate and complex diffractive image, for example as a Kinegram®, whereas the hologram area 110 can reconstruct a simple diffractive image, such as the already mentioned colored area. In this case when obliquely viewing the element 115 the viewer recognizes this colored area and the information 111 contained therein.

The layer structure of the security element 115 can be designed like that of the security element 10 represented in FIG. 5. Since the reflection layer in the surrounding hologram area 112 is formed in an all-over and continuous fashion, the second reflection layer 22 contributing to the subareas in no way disturbs the optical impression given by the hologram area 112.

EXAMPLE 14

FIG. 20

Figure 20:
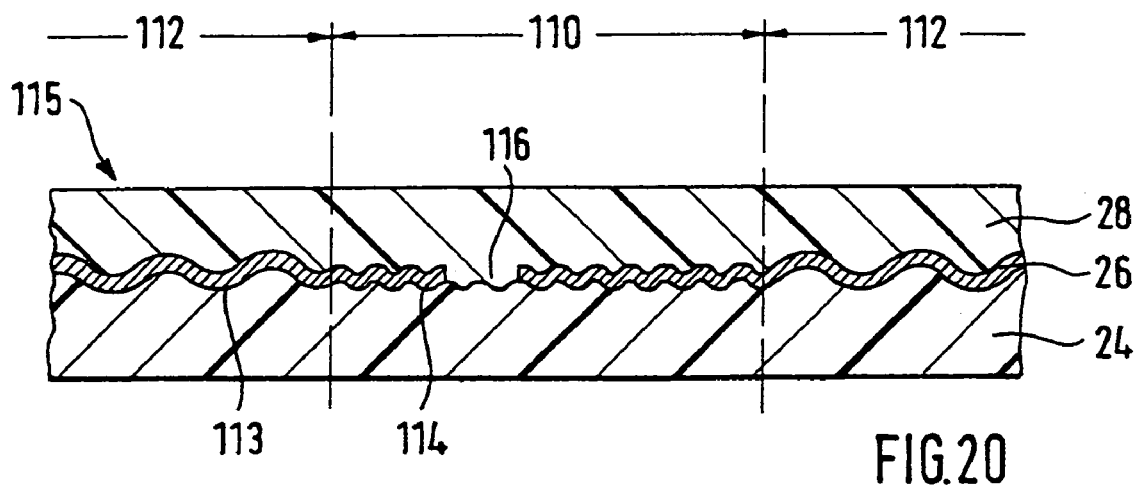
FIG. 20, 21 shows further variations of the security element according to the invention in cross section.

The security element 115 can also have a structure similar to that of the elements 71, 81 as represented in the FIG. 15, 16. FIG. 20 shows an embodiment of the element 115 in cross section, wherein the fringe range of the plastic layers 24, 28 in the relevant areas 112, 110 is provided with the respective diffraction structure 113,114. In the hologram area 112 the reflection layer 26, preferably a specularly reflecting metal layer, is applied in an all-over fashion without gaps. Whereas in the hologram area 110 the reflection layer 26 has gaps 116 in the form of the information 111 to be represented. These gaps 116, which represent the subareas according to the invention, are visible when viewing the hologram area 110 in transmitted light as well as when obliquely viewing the hologram area 110. With that the viewer is in a position to check the identity of the information recognizable in transmitted light and upon oblique viewing as an authenticity feature.

EXAMPLE 15

FIG. 21

Figure 21:
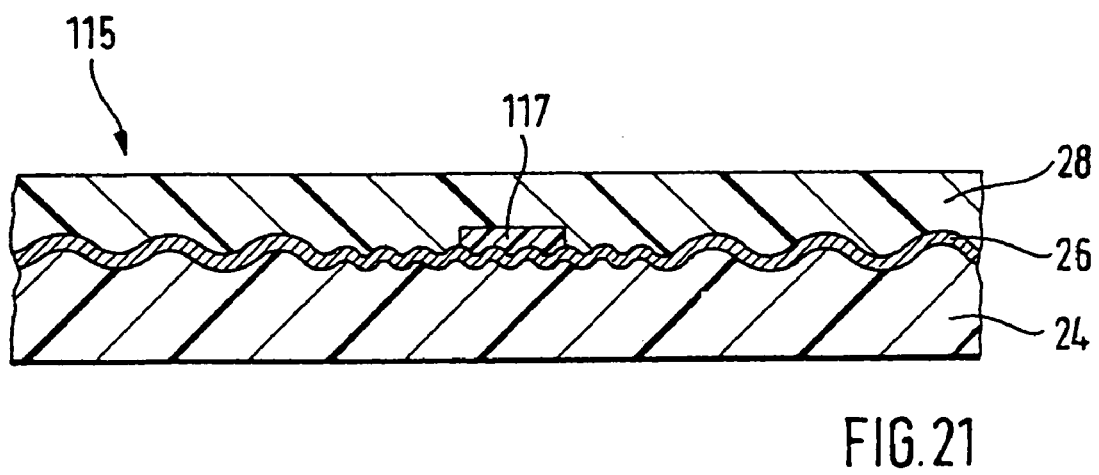

Analogous to the example already explained with reference to FIG. 16, in the case of the security element 115 the information represented by the subareas 111 can likewise be represented by printing on a printing ink, which substantially has the same reflecting properties as the reflection layer 26. This variant is shown in FIG. 21. In this example, however, the printed image 117 is directly applied onto the reflection layer 26. Alternatively, the printed image 117 of course can be applied onto the plastic layer 28.

This aspect of superficial embedding and the combination with further holograms not provided with subareas likewise can also be used for all other embodiments described herein.

EXAMPLE 16

FIG. 22, 23

According to a further embodiment the information represented by the subareas is not incorporated into the finished holograms but already during the so-called "origination process" into the embossing mold employed for the production of the embossed holograms. While an information subsequently produced in the finished hologram can be formed as a unique information, all embossed holograms produced with the same embossing mold have the same information.

Figure 22:
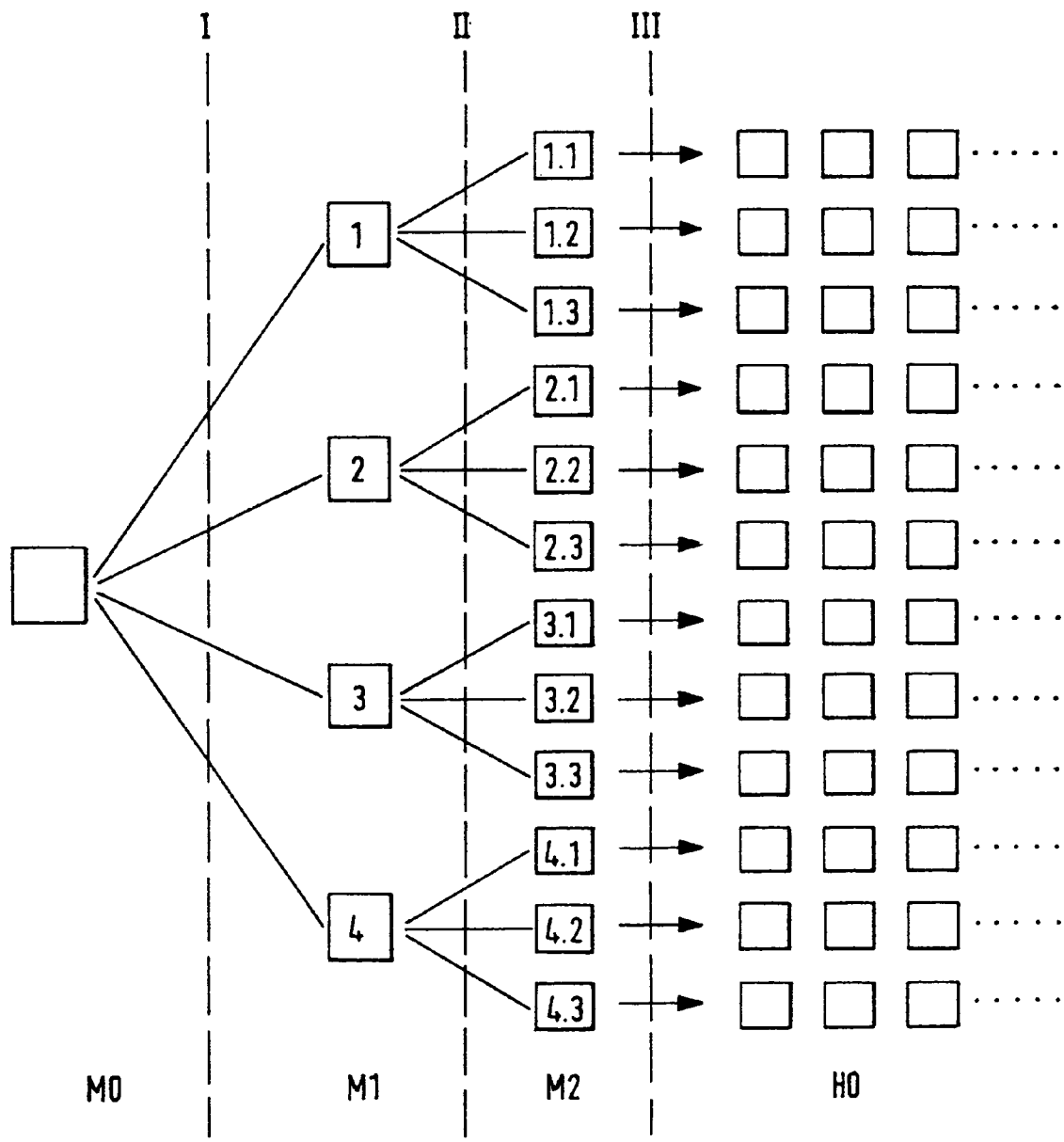
FIG. 22 shows the basic principle of the duplication of embossing dies and embossed holograms.

The manufacturing of such an embossing mold is schematically shown in FIG. 22. Here one starts out from an original mold, which already has the diffraction structure in the form of a relief structure and can be referred to as "master". This original mold in FIG. 22 is referred to as M0. In a first molding step I identical copies of the original mold M0 are produced and referred to as M1. In a second molding step II from each copy M1 a plurality of identical copies are produced, which altogether are referred to as M2. It is not before the third molding step III that the diffraction structure is transferred into the embossed holograms HO. All individualization measures, which are subsequently carried out with a laser in the finished holograms, in principle can also be performed in the embossing molds M1, M2 during the origination process after the molding step I and/or II.

If for example all denominations of a currency are to be provided with an embossed hologram, for the complete series, i.e. for all denominations can be selected the same base motif. The base motif is realized as diffraction structure in the original mold M0. The identical copies M1 molded therefrom can be changed with a laser in certain areas and thereby individualized. In this way at this stage embossing molds can be produced, which carry an information characterizing the individual denominations. For example, into the individual copies M1 the respective denomination can be incorporated as individualizing information. From each of these individualized embossing molds then in the second-molding step II a plurality of identical copies are produced. I.e., after the molding in step II for each bank note denomination one receives a plurality of identical embossing molds, with the help of which embossed holograms can be produced, which corresponding to the denomination represent individualized subseries. Accordingly, from the individualized embossing mold 1 further embossing molds 1.1 to 1.3 are produced which carry the same individualizing information. The same applies analogously to the shown embossing molds 2 to 4.

It is obvious that also in the copies of the embossing molds referred to as M2 individualization measures or additional individualization measures can be performed. Thereby, optionally, for different fabrication facilities or production lines different marks can be incorporated.

Finally, the subseries of holograms produced in this way can be provided with further individualization information at a later point of time with the help of the already described measures, for example by laser marking.

Figure 23:
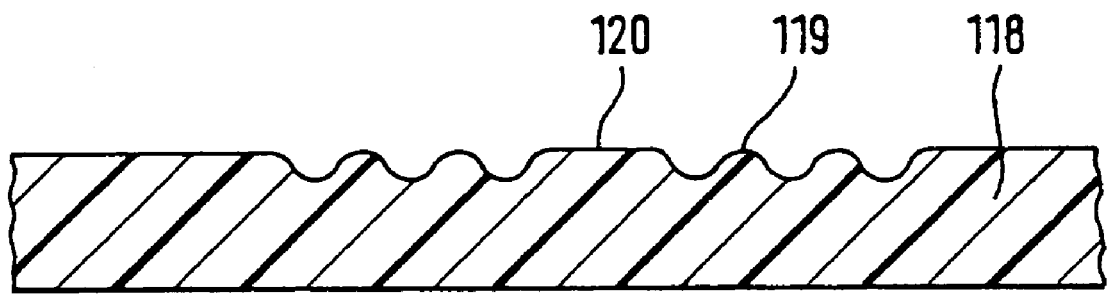
FIG. 23 shows a schematic representation of the transfer of a diffraction structure of an embossing die into a foil.

FIG. 23 shows a such individualized embossing mold in cross section. The embossing mold 118 in this case is formed as an embossing die and in one of the surfaces has the diffraction structure 119 in the form of a relief structure. This relief structure 119 was destroyed in the area 120 for example by means of a laser. During the embossing process the embossing die 118 is pressed into a plastic layer or embossable lacquer layer and thereby the relief structure and the destroyed areas 120 are transferred into the surface of the plastic layer. It is obvious that the embossing mold can also have any other form. In the mass production in particular cylindrical embossing molds are preferably used.

EXAMPLE 17

FIG. 24

Figure 24:
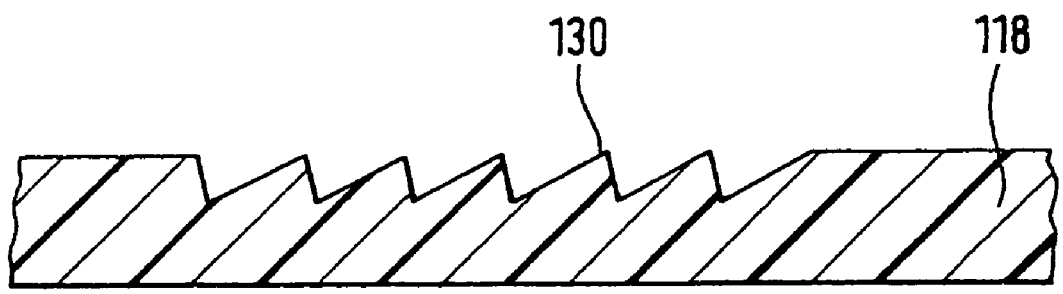
FIG. 24 shows a schematic diagram of a cross section through an embossing die with an asymmetric diffraction structure.

According to a further variant of the invention the embossed holograms are formed as so-called "asymmetric holograms". Asymmetric holograms have diffraction structures 130 with an asymmetric profile. FIG. 24 shows an embossing die 118 with such an asymmetric profile. With that an especially strong direction effect is achieved and the diffractively reconstructed images visible only under a predetermined viewing angle are especially bright. Asymmetric holograms preferably are used for security elements, which have a plurality of holograms interlaced into each other, which are recognizable under different viewing angles, as they are shown in FIG. 13 to 16.

It is obvious that all described variations of the security element and/or production methods according to the invention can be combined with each other.

The invention claimed is:

1. A security element, which has at least one area with a diffraction structure embossed during an embossing process with an embossing die, which under specific viewing conditions reconstructs a diffractive image, wherein the area has subareas being free of any diffraction structures, the subareas do not take part in the reconstruction of the diffractive image and represent a recognizable information, wherein the subareas and the diffraction structure surrounding the subareas have the same or at least very similar reflecting properties under viewing conditions, under which the diffraction structure does not represent a diffractive image, so that the recognizable information represented by the subareas is recognizable substantially only under the specific viewing conditions, under which the diffraction structure reconstructs the diffractive image, and wherein at least one of said subareas is produced during the embossing process with the embossing die already providing the at least one of said subareas being free of any diffraction structures.

2. The security element according to claim 1, wherein the area has a first reflection layer, which supports the reconstruction of the diffractive image.

3. The security element according to claim 1, wherein the subareas have no diffraction structure, and that a first reflection layer is disposed in both the area of the diffraction structure and the area of the subareas.

4. The security element according to claim 1, wherein the area has a transparent plastic layer, in which the diffraction structure is present in the form of a relief structure, that a first reflection layer is disposed on the surface of the plastic layer which is provided with the diffraction structure, and that the opposite surface of the plastic layer has a second reflection layer, wherein the subareas are formed by gaps in the first reflection layer.

5. The security element according to claim 4, wherein the first and second reflection layer are made of materials having substantially the same reflecting properties.

6. The security element of claim 5 wherein said materials are the same material.

7. A security element, which has at least one area with a diffraction structure embossed during an embossing process with an embossing die, which under specific viewing conditions reconstructs a diffractive image, wherein the area has subareas being free of any diffraction structures, the subareas do not take part in the reconstruction of the diffractive image and represent a recognizable information, wherein the subareas form a not diffractive contrast image, so that the recognizable information represented by the subareas is recognizable under viewing conditions differing from the specific viewing conditions, under which the diffraction structure reconstructs the diffractive image, and wherein at least one of said subareas is produced during the embossing process with the embossing die already providing the at least one of said subareas being free of any diffraction structures.

8. The security element according to claim 7, wherein the area has a transparent plastic layer, in which the diffraction structure is present in the form of a relief structure, and that a first reflection layer is disposed on the surface of the plastic layer which is provided with the diffraction structure, wherein the subareas are formed by gaps in the first reflection layer.

9. The security element according to claim 8, wherein the opposite surface of the plastic layer has a second reflection layer, wherein the first and second reflection layer are made of differently-colored materials.

10. The security element of claim 9 wherein said materials are differently-colored metals.

11. The security element of claim 10 wherein said metals are at least one of aluminum, copper or gold.

12. The security element according to claim 9, wherein the area is disposed on a transparent carrier, so that the information represented by the subareas is recognizable in transmitted light.

13. A method for producing a security element, comprising
embossing during an embossing process with an embossing die at least one area with a diffraction structure, which under specific viewing conditions reconstructs a diffractive image,
producing subareas of the area which do not take part in the reconstruction of the diffractive image, represents a recognizable information, and are integrated in the area with the diffraction structure such that the subareas and the diffraction structure surrounding the subareas have the same or at least very similar reflecting properties under viewing conditions, under which the diffraction structure does not represent a diffractive image, so that the recognizable information represented by the subareas is recognizable mainly only under the specific viewing conditions, under which the diffraction structure reconstructs the diffractive image, wherein at least one of said subareas is produced during the embossing process with the embossing die already providing the at least one said subareas being free of any diffraction structures.

14. A method for producing a security element, comprising
embossing during an embossing process with an embossing die at least one area with a diffraction structure, which under specific viewing conditions reconstructs a diffractive image,
producing subareas of the area which do not take part in the reconstruction of the diffractive image, represent a recognizable information and are integrated in the area with the diffraction structure such that the subareas form a not diffractive contrast image, so that the recognizable information represented by the subareas is recognizable under viewing conditions differing from the specific viewing conditions, under which the diffraction structure reconstructs the diffractive image, wherein at least one of said subareas is produced during the embossing process with the embossing die already providing the at least one of said subareas being free of any diffraction structures.

* * * * *